United States Patent [19]
Claassen et al.

[11] 3,807,982
[45] Apr. 30, 1974

[54] APPARATUS FOR CONVEYING HEAT TREATED FLAT OR SHAPED GLASS SHEETS

[75] Inventors: George R. Claassen, New Kensington; Rudy Canonaco, Cheswick, both of Pa.

[73] Assignee: PPG Industries, Inc., Pittsburgh, Pa.

[22] Filed: Sept. 5, 1972

[21] Appl. No.: 285,998

[52] U.S. Cl.................... 65/253, 29/116 R, 29/122, 198/192
[51] Int. Cl.............................................. C03b 35/00
[58] Field of Search........ 65/254, 253, 104; 29/110, 29/116 R, 122; 198/192

[56] References Cited
UNITED STATES PATENTS
3,701,644  10/1972  Frank............................. 65/253 X
3,301,383  1/1967  Doyer............................. 198/192 R Primary Examiner—Arthur D. Kellogg
Attorney, Agent, or Firm—Edward I. Mates

[57] ABSTRACT

Apparatus for conveying hot glass sheets in a non-vertical orientation through a cooling station on spaced rolls capable of adjustment to support and convey either flat or shaped glass sheets. Separate cover means that is harmless to hot glass is provided for covering the periphery of each roll without closing the space between adjacent rolls so that the space between adjacent rolls is left open to permit free flow of cooling fluid against the supported surface of the conveyed hot glass sheets.

10 Claims, 3 Drawing Figures

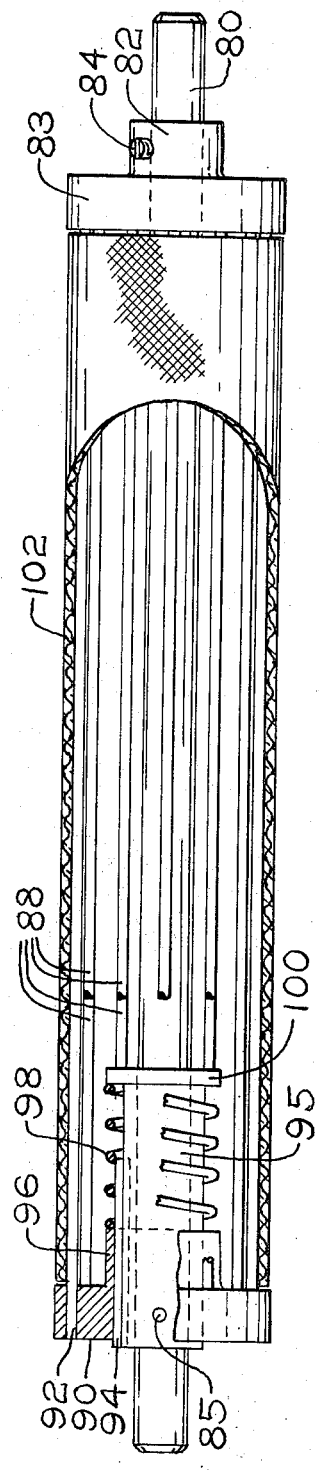
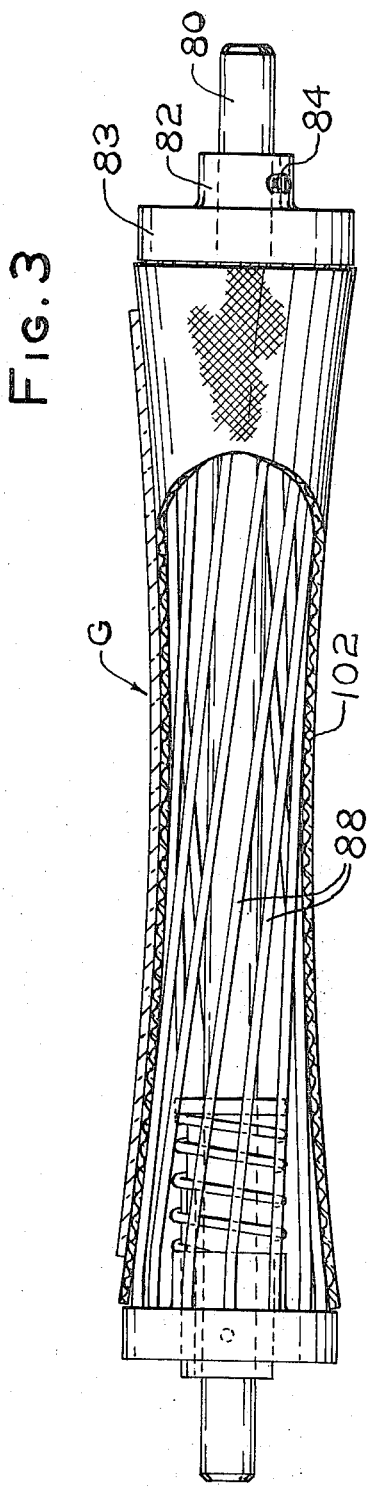
FIG. 2
FIG. 3

APPARATUS FOR CONVEYING HEAT TREATED FLAT OR SHAPED GLASS SHEETS

BACKGROUND OF THE INVENTION

1. Field of the Invention

The present invention relates to apparatus for conveying hot glass sheets in a non-vertical orientation and particularly relates to apparatus for conveying hot, shaped glass sheets through a cooling station. The apparatus of the present invention is of the conveyor roll type. When glass sheets are bent and then cooled for tempering or heat-strengthening, the glass is first heated to its deformation temperature so that it can be shaped to the desired curvature. However, when glass is sufficiently hot to be shaped or heat-strengthened, its surfaces are very susceptible to becoming marked and/or distorted, especially when the hot glass is conveyed along a series of rolls having sufficient rigidity at elevated temperatures needed for glass tempering to support the glass sheets as they are conveyed through regions of different temperatures.

It has been suggested to selectively chill the surface only of the hot glass to avoid surface marking resulting from direct roll to hot glass contact. However, any premature chilling of the glass surface reduces the overall glass temperature and reduces the maximum compression stress that can be obtained by subsequent chilling. Furthermore, any chilling that is uneven from surface to surface may cause warpage of the sheet and uniform cooling that avoids warpage is difficult to obtain.

It has also been proposed to shape the glass like a dome and support the glass along its longitudinal side edges only from the shaping station to the cooling station in order to reduce glass to roll contact. If the shaped glass is deposited directly on the conveyor rolls, the utility of such a suggestion is limited to certain shapes of glass having straight side edges only.

Carriages with movable glass supporting fingers have been used to transfer glass sheets from a shaping station for redeposition on the conveyor rolls at a cooling station. Such finger support may sometimes provide too small an area for supporting the entire glass mass and thus may cause local variations from desired shape that results in optical distortion when the glass is too heavy to be supported on spaced fingers defining narrow areas of support.

Flat glass sheets have been supported on solid conveyor rolls provided with covers of a material that does not harm hot glass surfaces on rolling contact therewith. However, prior to the present invention, covered rolls provided with the capability of adjustment to curved shapes were not provided with sufficient structural rigidity about their periphery to avoid a whipping or vibratory action when the glass conveying rolls rotated at high speeds. Such vibratory action causes the roll peripheral surface to deviate from the adjusted curved shape at which the roll is intended to rotate.

2. The Prior Art

U.S. Pat. No. 3,301,383 to Doyer discloses a conveyor belt supported on a series of rolls comprising a central shaft and a plurality of straight rods all of which cross the roller shaft at the same angle and at the same distance. The rods are made of plastic, so the rolls are unsuitable for contacting hot glass at the glass deformation temperature. In addition, the Doyer rolls support a continuous belt for conveying work pieces. Such a conveyor would not be suitable for conveying glass sheets between a pair of opposed plenum chambers having opposed nozzle openings through which chilling medium such as air is blasted to temper heat-softened glass. The Doyer belt would interfere with the free flow of chilling medium toward the under surface of conveyed glass sheets.

Other patents showing rolls having adjustable work contacting shapes are U.S. Pats., No. 763,251 to Breck; No. 2,771,658 to Morrill, No. 2,898,662 to Robertson; No. 2,960,749 to Robertson et al.; No. 2,996,784 to Young; No. 3,012,301 to Rogers et al.; No. 3,088,580 to Hughes; No. 3,094,771 to Robertson; No. 3,157,935 to Birch; No. 3,220,538 to Kelley; No. 3,328,866 to Robertson and No. 3,500,524 to Jagminas. These latter patents show various constructions that differ considerably from the construction of the present invention and none of these patents relate to rolls for use in conveying shaped glass sheets through a tempering station.

Other patents on conveyor rolls that change shape to accommodate for glass sheet shapes are U.S. Pat. No. 3,485,615 to Rahrig et al. and No. 3,485,618 to Ritter. While these last two named patents show conveyor rolls adapted to convey hot glass, their principle of operation is entirely different from that of the present invention in that they lack a rigid central driving shaft or a series of peripheral shafts that retain their shape during a driving operation. Hence, the conveyor rolls of these patents do not prevent a whipping or vibratory action when the rolls are rotated at elevated speeds needed for high speed mass processing of bent and tempered glass sheets.

SUMMARY OF THE INVENTION

The present invention relates to a roll type conveyor, especially suitable for conveying hot glass sheets through a glass chilling station. The rolls have a rigid center shaft, a pair of axially spaced hubs mounted on the center shaft, additional peripheral shafts interconnecting the peripheral portions of said hubs, and means for adjusting the angular position of at least one of said hubs with respect to the other hub so that the peripheral shafts extend at an angle to the rigid center shaft from hub to hub, thus defining a series of lines that intersect a curvilinear plane conforming to the shape of conveyed bent glass sheets and provide obliquely disposed lines of support that rotate about the center shaft into and out of a plane defining the path of glass movement. Each roll is individually covered with a sleeve of resilient material that does not mar hot glass, such as a porous refractory material such as a fiber glass sleeve. The space between adjacent conveyor rolls is left open to allow free flow of tempering medium. In addition, since the porous sleeve is mounted around spaced rods, space is provided for passage of tempering medium through portions of the porous sleeve.

BRIEF DESCRIPTION OF THE DRAWINGS

In the drawings which form part of a description of a preferred embodiment of the present invention and wherein like reference numbers refer to like structural elements.

FIG. 2 is a fragmentary transverse view of a conveyor roll according to the present invention adjusted to convey flat glass, with certain parts omitted to show other parts clearly, and FIG. 3 is a view similar to FIG. 2, showing the roll of FIG. 2 adjusted to support and convey curved glass sheets.

DESCRIPTION OF A PREFERRED EMBODIMENT OF THE INVENTION

Figure 1:
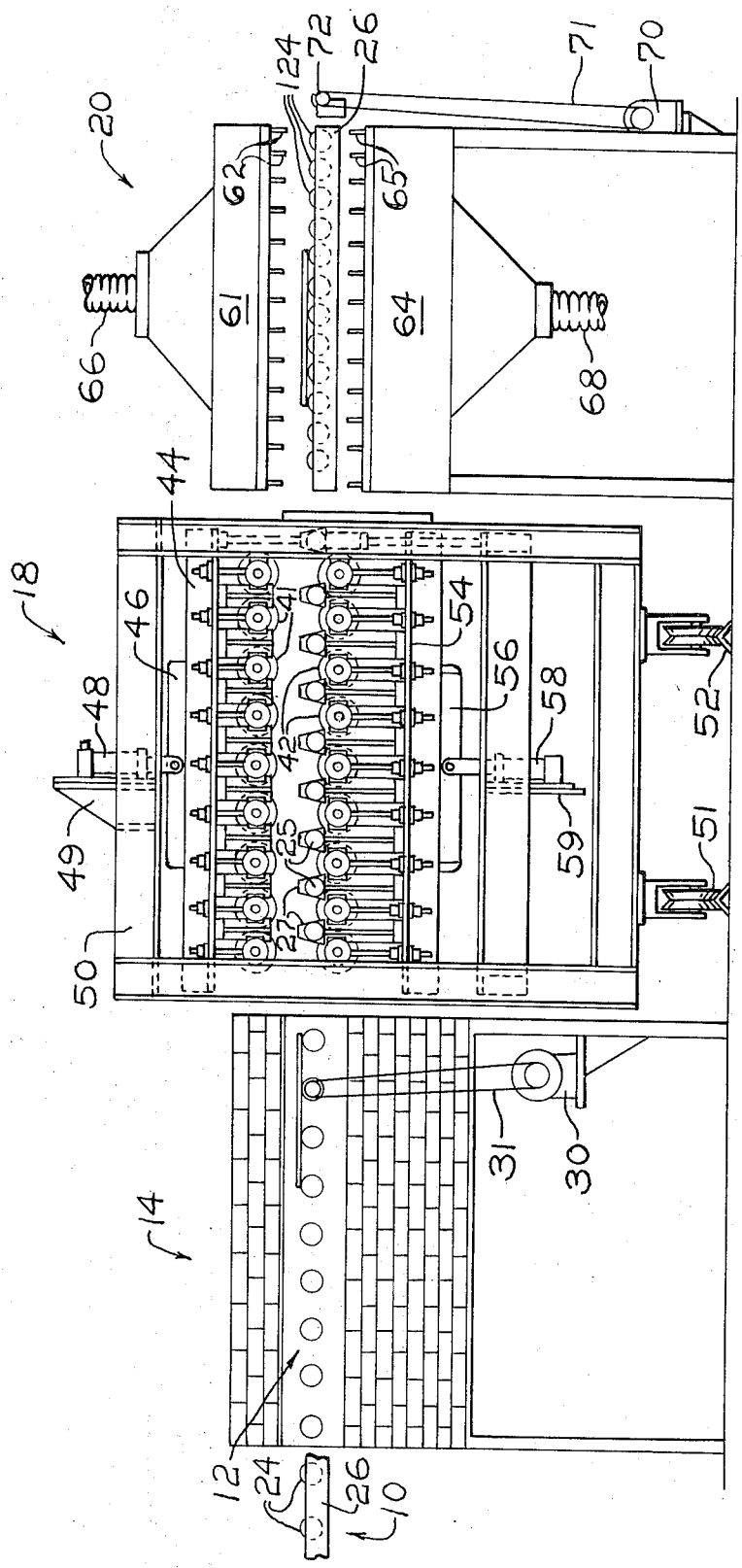
FIG. 1 is a longitudinal assembly view of a glass sheet bending and tempering apparatus suitable for incorporating rolls according to the present invention at the glass sheet cooling station.

A preferred embodiment of apparatus suitable for using the present invention comprises a horizontal conveyor 10 extending through a loading station 12, a tunnel type furnace 14, a bending station 18, a chilling station 20, one or more cooling stations as needed (not shown) and an unloading station (not shown) beyond the chilling station. The horizontal conveyor 10 comprises a series of transversely extending, longitudinal spaced rolls 24, 25 and 124. Rolls 24 and 124 are supported at their opposite ends on bearing housings carried by longitudinally extending supports 26 (mostly broken away) mounted on vertical pillars (not shown), while conveyor rolls 25 are mounted on spaced bearing brackets 27 at the bending station 18.

The conveyor portion from the loading station 12 through the cooling station 20 is run continuously at an established conveyor speed from a drive motor 30 which is connected through a driving chain 31 to a drive sprocket 32 and chain drives (not shown) to sprockets fixed to one of the conveyor rolls 24 and interconnected by one or more drive chains to other drive sprockets fixed to each conveyor roll in the usual manner. The rolls 24, 25 and 124 are disposed either horizontally or at a slight oblique angle transverse to the path of movement to define a support plane along which a series of glass sheets is conveyed in a predetermined conveyor path extending through the loading station 12, the furnace 14, the bending station 18, the chilling station 20, the cooling stations (if included) and the unloading station.

Furnace 14 has the usual heating elements 34 and 36 disposed above and below the path taken by glass sheets as the conveyor rolls 24 are rotated in unison to engage and propel the glass sheets forward by friction in the usual manner. Thus, the glass sheets are heated to a temperature of 1,200° Fahrenheit to 1,300° Fahrenheit while conveyed through the furnace.

Intermediate vertical planes occupied by each of the adjacent conveyor rolls 25 of the portion of the conveyor path extending through the bending station 18 is a pair of sets of shaped rolls 41 and 42 of complementary contour. Each upper shaped roll 41 is aligned with a corresponding lower shaped roll 42. The upper rolls are rotatably supported from their ends by vertically adjustable trunnions in an open frame structure 44 depending from an upper platform 46 which is attached to the lower end of a rod of an upper piston 48 carried on the upper portion 49 of a movable frame mechanism 50. The latter is provided with wheels 51 that ride on tracks 52 to facilitate sideways displacement of the frame mechanism 50. Similarly, the lower rolls 42 are rotatably supported on vertically adjustable trunnions in a lower open frame 54 connected to and supported by a lower platform 56. The lower platform is attached to the upper end of a rod of a lower piston 58. A lower portion 59 of frame mechanism 50 carries the lower piston 58. Means is provided for rotating rolls 41 and 42 at approximately the same peripheral speed as rolls 25 so that when a glass sheet moves over the conveyor rolls 25 at the bending station 18, the lower set of shaped rolls 42 move upward to lift the heat-softened glass off the conveyor rolls 24 and into rolling pressurized contact against the upper set of shaped rolls 41 for a brief interval sufficient to impose the curvature of the rolls onto the heat-softened glass sheet before the lower rolls 42 retract to redeposit the shaped glass sheet on the conveyor rolls 25. The details of the roll pressing apparatus do not form part of the present invention but is the subject matter of U.S. Pat. No. 3,701,644 of Robert G. Frank, the disclosure of which is incorporated herein by reference.

The chilling station 20 comprises an upper plenum chamber 61 having downwardly extending nozzles 62 whose exit openings are disposed above special conveyor rolls 124 that extend horizontally in a transverse direction in longitudinally spaced relation throughout the chilling station 20 and a lower plenum chamber 64 having upwardly facing nozzles 65 extending upward toward the spaces between the conveyor rolls 124 of the chilling station 20. Means is provided for delivering air under pressure through delivery passages 66 and 68 to the respective plenum chambers 61 and 64 so that cool air blasts may be imparted to the upper and lower surfaces of glass sheets that are conveyed through the chilling station 20. A drive motor 70, drive chain 71 and sprocket 72 may be provided to impart rotation to selected sections of the conveyor rolls 24, 25 and/or 124 through additional chain drives and clutches (not shown) at different speeds if desired in a manner well known in the conveyor art.

The gist of the present invention is in providing special conveyor rolls 124 at the chilling station 20. The special conveyor rolls are capable of adjusting the shape of their peripheral portion to provide glass supporting elements that extend either parallel to a central shaft that drives the rolls or are angled relative to said central shaft. When the elements are parallel to the central shaft, the rolls support flat glass. When the elements are twisted relative to the central shaft, they provide spaced oblique lines of support along a curved surface of concave elevation that may be adjusted to conform to a desired curved shape, preferably that of the conveyed glass sheets. The glass supporting elements are peripherally arranged and made of flexible metal rods that provide structural rigidity to support the conveyed glass sheets, but that would tend to mar the surface of heat-softened glass sheets if brought into direct engagement. Hence, each roll is provided with glass engaging means individual for each roll and of a porous material that does not harm glass that protects the moving glass sheets from making direct contact with the peripherally arranged glass supporting elements. The space between adjacent conveyor rolls 124 is open to allow free air movement so that hot glass sheets conveyed by the rolls between upper plenum 61 and lower plenum 64 can be chilled rapidly and thus tempered. In addition, the glass supporting elements are spaced so that the porous material also permits movement of cooling medium against the lower surface of supported glass sheets.

FIGS. 2 and 3 show in detail the special structure of each individual conveyor roll 124 that is useful in the performance of the present invention. FIG. 2 shows a typical conveyor roll of the present invention adjusted to support and convey flat glass sheets and FIG. 3 shows the conveyor roll adjusted to provide a curved surface whose upper portion is concavely curved in cross-section so that it can support and convey shaped glass sheets. Each roll 124 comprises a centrally disposed shaft 80, one end portion of which is connected to a sprocket (not shown) that is connected through a conventional chain drive (not shown) to sprocket 32 so that drive motor 30 causes all of the spaced conveyor rolls 124 to be rotated in unison except when a section of the conveyor system is driven through a clutch and motor 70.

To the right hand side of the view in FIG. 2 there is a locking collar 82 disposed in slidable and rotatable relationship relative to shaft 80 and forming an extension of a hub 83. A set screw 84 is provided to fix the position of the locking collar 82 and its attached hub 83 both longitudinally and circumferentially with respect to shaft 80. The hub 83 is enlarged and is circumferencially apertured at its inner end to receive the right hand end of a dozen flexible rods 88 which are received at 30° spacing around the periphery of the enlarged hub 83 fixed to the locking collar 82. The rods 88 have sufficient rigidity to support a moving glass sheet thereon without appreciable distortion. A second hub 90 which also contains a dozen apertures 92 for receiving the left hand end of each of the flexible rods 88 is slidably supported along an axially extending key 94. The latter protrudes from the outer wall of a tube 95 rigidly connected to shaft 80 by another set screw 85. Each of the flexible rods 88 interconnects one of the 12 peripherally spaced apertures 92 of the second hub 90 and a corresponding aperture disposed in the enlarged hub 83 attached to locking collar 82.

The second hub 90 has a centrally disposed abutment 96 which engages the left end of a spring 98. An abutment 100 on the inner end of tube 95 engages the inner end of spring 98.

An expandable sleeve of fiber glass 102 or other porous material that does not harm heat-softened glass is supported over the dozen peripherally spaced flexible rods 88 that are interconnected between the hubs 83 and 90 in spaced relation to shaft 80. Thus, the flexible rods 88 support a sleeve 102 for each roll 124 in spaced relation to the center shaft 80.

When the conveyor rolls 124 are adjusted to support flat glass sheets, all of the flexible rods 88 extend parallel to the centrally disposed shaft 80 to provide a cylindrically shaped conveyor roll having a discontinuous surface portion with a cover 102 thereon of a material that does not harm heat-softened glass. However, when it becomes necessary to convey glass sheets G that have been shaped, the set screw 84 is loosened and the locking collar 82 is rotated at an angle with respect to the hub 90 so that the individual flexible rods 88 extend at an angle with respect to the centrally disposed shaft 80. The sleeve 102, which is expandable, conforms to the curved discontinuous peripheral shape present between twisted flexible rods 88.

When the flexible rods 88 are thus twisted, they tend to pull the hub 90 toward the hub 83. The position of spring 98 between abutment 100 and abutment 96 maintains the twisted rods 88 in tension.

Since the conveyor rolls 124 are required to convey relatively hot glass sheets, at least in the entrance end of chilling station 20, it is necessary that the flexible rods 88 be of a material that will not wear rapidly at high temperature. Metal or metal alloy having sufficient ductility to form a rod and sufficient rigidity to support a glass sheet is a suitable material for the peripheral rods. Steel rods three thirty-seconds inch in diameter have been found to be most acceptable for these flexible, peripherally spaced, glass supporting rods.

In a preferred embodiment of the present invention, conveyor rolls 124 for use in processing glass sheets up to 18 inches in their smallest dimension are spaced on 6 inch centers and comprise a center shaft of ⅝ inch diameter provided with hubs having a three inch diameter spaced approximately 19 inches along the length of the central shaft from one another. The peripherally arranged flexible rods are approximately 0.10 inch in diameter and are mounted with their ends disposed 30° from one another around the periphery of the opposing hubs. Preferably, the fiber glass sleeve is composed of woven fiber glass cloth composed of warp 28, fill 30, core and effect yarn 150–2/2–0 in both warp and fill, two ends in core, 5 percent over feed, two ends in effect, 80 percent over feed. This material is disclosed in U.S. Pat. No. 3,223,504 to James H. Cypher and Clement E. Valchar. The cover has the ability to stretch over the peripheral wires and conform to the peripheral shape of the roll 124 in either the condition of the roll depicted in FIG. 2 for supporting flat glass or that depicted in FIG. 3 for supporting curved glass. In other words, the sleeve of fiber glass is woven in such a manner that it is form fitting about the shape provided by the peripherally arranged rods interconnecting the hubs. The center shafts are 6 inches center to center.

While the rolls have been shown for use in a chilling station forming part of a roll pressing apparatus, it is understood that the rolls are also suitable for use in any kind of tempering apparatus and are suitable for use in conjunction with any type of shaping station, such as a press bending station where the glass is stopped and engaged by complementary shaping members at a shaping station before being returned to a conveyor or a vacuum shaping station wherein vacuum is used in part or entirely to help shape the glass. The special cooling station rolls of the present invention may also be used with any type of conveyor for the furnace and/or the bending station such as a gas hearth rather than the roll conveyor depicted.

The form of the invention shown and described in this disclosure represents an illustrative preferred embodiment thereof. It is understood that various changes may be made without departing from the spirit of the invention as defined in the claimed subject matter that follows.

We claim:

1. Apparatus for conveying heated glass sheets that are either flat or curved comprising a plurality of longitudinally spaced rolls disposed along a given path, each roll including a central shaft, a pair of axially spaced hubs mounted on said central shaft, means for rotating said central shafts in unison, a series of peripheral shafts having sufficient rigidity to support a moving glass sheet thereon without appreciable distortion interconnecting said hubs, means securing one of said hubs on said central shaft in any of a series of positions in alignment with or in angularly offset relation relative to the other of said hubs to enable said hubs to support said peripheral shafts along spaced portions of a discontinuous curved surface whose upper portion is one of a series of surfaces of different curvature concavely curved or flat in cross-section, and individual cover means of a material harmless to glass for each roll supported around said peripheral shafts of each said roll in spaced relation to said central shaft to protect said conveyed glass sheets from direct contact with said peripheral shafts and to enable said space between adjacent rolls to be open to permit free passage of air between adjacent rolls.

2. Apparatus as in claim 1, wherein said cover means harmless to glass consists essentially of an expandable porous fiber glass sleeve mounted over said peripheral shafts to provide a curved glass sheet supporting surface smoothly fitting over said peripheral shafts.

3. Apparatus as in claim 1, wherein said peripheral shafts are composed of a flexible metal or metal alloy having sufficient ductility to form a rod.

4. Apparatus as in claim 3, wherein said flexible metal is spring steel.

5. Apparatus as in claim 1, wherein said plurality of longitudinally spaced rolls is disposed along a given path between a pair of plenum chambers spaced on opposite sides of said given path, each of said plenum chambers leading into orifices for supplying cooling medium under pressure against opposite sides of said given path to impinge against the opposite surfaces of said heated, shaped glass sheet as the latter transverses said given path.

6. Apparatus as in claim 5, wherein said given path is an extension of a conveyor comprising solid rolls for transporting a succession of glass sheets through a furnace and a glass shaping station.

7. Apparatus as in claim 6, wherein said glass shaping station is a roll pressing station.

8. A conveyor roll for supporting a glass sheet for movement between spaced, opposed plenum chambers comprising a central shaft, a pair of axially aligned hubs mounted on said central shaft, a series of peripheral shafts having sufficient rigidity to support a moving glass sheet thereon without appreciable distortion connecting said hubs, means securing one of said hubs on said central shaft in any of a series of positions in alignment with or in angularly offset relation relative to the other of said hubs to enable said hubs to support said peripheral shafts along spaced portions of a discontinuous curved surface whose upper portion is one of a series of surfaces of different curvature concavely curved or flat in cross-section, and individual cover means of a material harmless to glass supported around said peripheral shafts of said roll in contact with each of said peripheral shafts and in spaced relation to said central shaft to protect said moving glass sheet from direct contact with said peripheral shafts.

9. A conveyor roll as in claim 8, wherein said cover means harmless to glass consists essentially of an expandable porous fiber glass sleeve mounted over said peripheral shafts to provide a curved glass sheet supporting surface smoothly fitting over said peripheral shafts.

10. A conveyor roll as in claim 8, wherein said peripheral shafts are composed of a flexible metal or metal alloy having sufficient ductility to form a rod.

* * * * *